United States Patent
Maienschein et al.

(10) Patent No.: US 7,654,172 B2
(45) Date of Patent: Feb. 2, 2010

(54) TORQUE TRANSMISSION DEVICE

(75) Inventors: Stephan Maienschein, Baden-Baden (DE); Marc Meisner, Buehl-Weitenung (DE)

(73) Assignee: LuK Lamellen und Kupplungsbau Beteiligungs KG, Buehl (DE)

(*) Notice: Subject to any disclaimer, the term of this patent is extended or adjusted under 35 U.S.C. 154(b) by 393 days.

(21) Appl. No.: 11/633,369

(22) Filed: Dec. 4, 2006

(65) Prior Publication Data

US 2007/0157611 A1 Jul. 12, 2007

(30) Foreign Application Priority Data

Dec. 13, 2005 (DE) .................... 10 2005 059 408

(51) Int. Cl.
*F16H 61/00* (2006.01)
*F16D 3/00* (2006.01)
(52) U.S. Cl. .................... 74/606 R; 464/98; 464/904
(58) Field of Classification Search ............. 74/606 R; 464/98, 99, 51, 68, 904
See application file for complete search history.

(56) References Cited

U.S. PATENT DOCUMENTS

| 3,642,097 | A  | * | 2/1972  | Koivunen ................... 184/6 |
| 4,327,603 | A  | * | 5/1982  | Zaunberger et al. ......... 475/22 |
| 5,195,622 | A  | * | 3/1993  | Tauvron et al. ............ 192/3.29 |
| 6,561,330 | B2 | * | 5/2003  | Maienschein et al. ...... 192/3.29 |
| 6,620,049 | B1 | * | 9/2003  | Kundermann ............... 464/98 |
| 6,669,568 | B1 | * | 12/2003 | Neuner et al. .............. 464/75 |
| 2001/0001768 | A1 | * | 5/2001 | Kundermann .............. 464/157 |

* cited by examiner

*Primary Examiner*—Tisha D Lewis
(74) *Attorney, Agent, or Firm*—Davidson, Davidson & Kappel, LLC

(57) ABSTRACT

A torque transmission device having a torque converter which is accommodated in the drivetrain of a motor vehicle, for transmitting torque between a drive unit and a transmission, has a converter housing that is rotationally mounted about an axis of rotation and is nonrotatably connected to the drive unit. The torsionally fixed connection between the drive unit and the converter housing includes a tubular connecting element that is located coaxially to the axis of rotation of the converter housing.

13 Claims, 3 Drawing Sheets

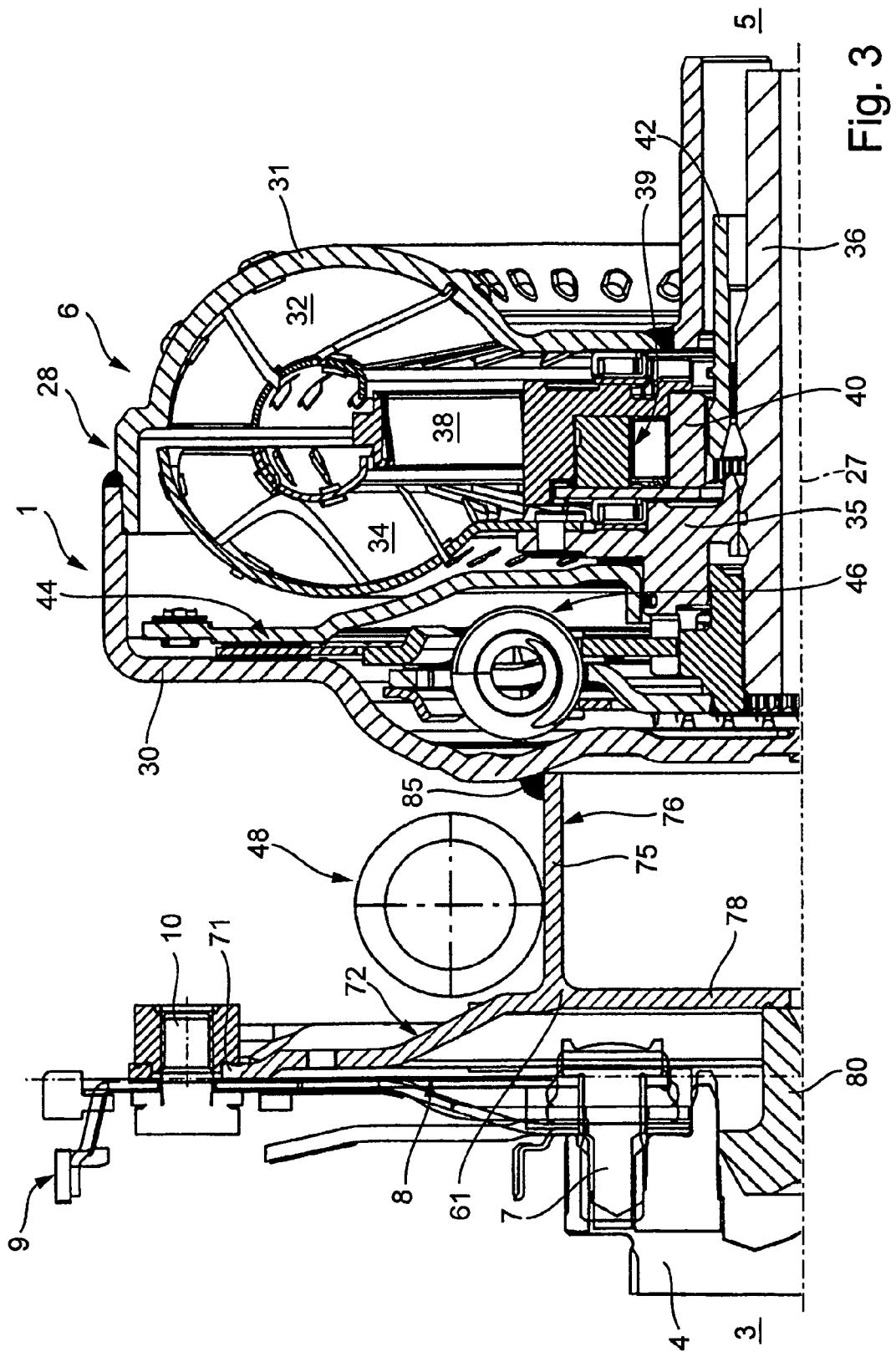

TORQUE TRANSMISSION DEVICE

This claims the benefit of German Patent Application No. 10 2005 059 408.5, filed Dec. 13, 2005 and hereby incorporated by reference herein.

BACKGROUND INFORMATION

The present invention relates to a torque transmission device having a torque converter which is accommodated in the drivetrain of a motor vehicle, for transmitting torque between a drive unit and a transmission, and which has a converter housing that is rotationally mounted about an axis of rotation and is nonrotatably connected to the drive unit.

SUMMARY OF THE INVENTION

An object of the present invention is to devise a torque transmission device, which will be optimized with respect to space requirements, have a simple design, and be cost-effective to manufacture.

The present invention provides a torque transmission device having a torque converter which is accommodated in the drivetrain of a motor vehicle, for transmitting torque between a drive unit and a transmission, and which has a converter housing that is rotationally mounted about an axis of rotation and is nonrotatably connected to the drive unit, that the torsionally fixed connection between the drive unit and the converter housing includes a tubular connecting element that is disposed coaxially to the axis of rotation of the converter housing. The configuration of the connecting element creates a clearance space radially outside of the same in the axial direction between the drive unit and the converter housing, permitting a drive shaft, projecting from a differential gear, for example, to pass through perpendicularly to the axis of rotation of the torque converter.

One preferred exemplary embodiment of the torque transmission device provides for a fastening flange, which is attached to the converter housing, to extend from the end of the connecting element facing the converter housing. The fastening flange is preferably welded to the converter housing.

Another preferred exemplary embodiment of the torque transmission device provides for the fastening flange to project radially outwardly from the end of the connecting element facing the converter housing. This facilitates welding of the fastening flange to the converter housing.

Another preferred exemplary embodiment of the torque transmission device provides for the fastening flange to have a plurality of centering tabs which engage in centering recesses provided in the converter housing. This permits centering of the connecting element in relation to the converter housing in a simple manner.

Yet another preferred exemplary embodiment of the torque transmission device provides for the end of the connecting element facing away from the converter housing to be terminated by an end wall. The end wall enhances the stiffness of the connecting element.

Another preferred exemplary embodiment of the torque transmission device provides for the end wall to be integrally formed in one piece with the connecting element. This reduces the number of structural components requiring assembly or connection.

Another preferred exemplary embodiment of the torque transmission device provides for the end wall to have the shape of a circular disk having a bent-over peripheral region. The bent-over peripheral region is used for integrally joining, in particular welding, the end wall to the connecting element at any given axial positions.

Another preferred exemplary embodiment of the torque transmission device provides for the end wall to have a centering element. The centering element preferably projects from the end wall into an opening that is provided in an output shaft leading out from the drive unit.

Another preferred exemplary embodiment of the torque transmission device provides for a torque converter drive plate to be fastened to the end of the connecting element facing away from the converter housing. The torque converter drive plate is preferably secured on the drive side to a so-called flexplate, which is fastened, in turn, to an output shaft projecting from the drive unit.

Another preferred exemplary embodiment of the torque transmission device provides for the torque converter drive plate to have a tubular fastening portion from which a driving flange projects radially outwardly.

The tubular fastening portion of the torque converter drive plate is integrally joined, in particular welded, to the connecting element.

Another preferred exemplary embodiment of the torque transmission device provides for the torque converter drive plate and the connecting element to be integrally joined together to form one piece. This reduces the number of structural components requiring assembly or connection.

Other preferred exemplary embodiments of the torque transmission device provide for the connecting element to be a formed part, in particular a rollformed part. The connecting element is preferably integrally formed in one piece with the fastening flange, the end wall, and/or the torque converter drive plate.

Other advantages and features of the present invention and details pertaining thereto are derived from the following description in which various exemplary embodiments are explained in detail with reference to the drawings. In the accompanying drawings, the figures show:

BRIEF DESCRIPTION OF THE DRAWINGS

FIG. 3 shows a torque transmission device in accordance with a third exemplary embodiment, in half section.

DETAILED DESCRIPTION

Figure 1:
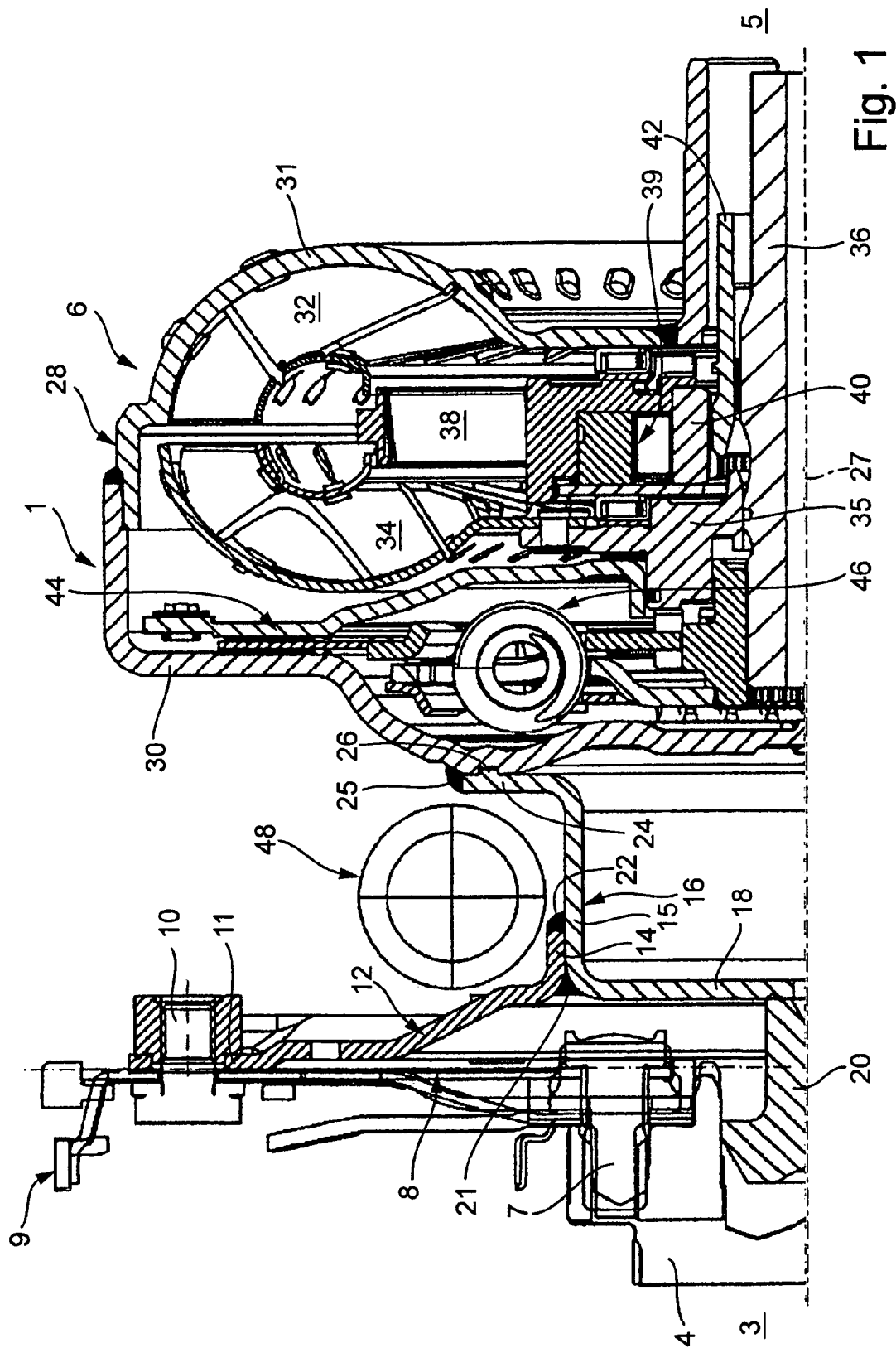
FIG. 1 shows a torque transmission device in accordance with a first exemplary embodiment, in half section.

A portion of a drivetrain 1 of a motor vehicle is illustrated in FIG. 1. Accommodated between a drive unit 3, for example an internal combustion engine, a crankshaft 4 leading out therefrom, and a transmission 5, is a hydrodynamic torque converter 6. Crankshaft 4 of internal combustion engine 3 is fixedly connected via bolted connections 7 to a driving disk 8 which essentially has the shape of a radially extending annular disk. Driving disk 8 is referred to as a flexplate. A flywheel ring gear 9 is provided radially externally to driving disk 8.

A fastening flange 11 of a torque converter drive plate 12 is secured by bolted connections 10 to the radially outer peripheral region of driving disk 8. Radially inwardly, torque converter drive plate 12 has a tubular fastening portion 14. Tubular fastening portion 14 is slid onto a tubular connecting portion 15 of a connecting element 16. Connecting element 16 has the shape of a circular cylindrical surface, which is terminated at its drive-side end by an end wall 18. End wall 18 is integrally formed in one piece with tubular connecting portion 15. On the drive side, a mushroom-shaped centering element 20 is fastened to end wall 18. Mushroom-shaped centering element 20 projects into a blind hole recessed in crankshaft 4.

Fastening portion 14 of torque converter drive plate 12 is secured by weld seams 21, 22 to connecting element 16. A fastening flange 24, which projects radially outwardly, extends from the end of tubular connecting portion 15 of connecting element 16 facing transmission 5. Fastening flange 24 is secured radially outwardly by a weld seam 25 to a housing 28 of torque converter 6. Radially inwardly of weld seam 25, fastening flange 24 has a plurality of centering tabs 26, which engage in corresponding recesses of housing 28 of torque converter 6. Housing 28 of torque converter 6 is rotatable about an axis of rotation 27 and is equipped with a drive-proximal housing wall 30 and a drive-distal housing wall 31. Fastening flange 24 of connecting element 16 is secured to drive-proximal housing wall 30. Drive-distal housing wall 31 is combined with an impeller 32 of hydrodynamic torque converter 6 to form one subassembly.

Interposed between impeller 32 and drive-proximal housing wall 30 is a turbine 34 which is secured radially inwardly to a turbine hub 35. Turbine hub 35 is connected nonrotatably to an input shaft 36 of transmission 5. Located between turbine 34 and impeller 32 is a stator 38 which is supported by a freewheel 39 on an impeller hub 40 that is mounted, for example, by way of a toothing on a housing-mounted tubular piece 42. Interposed in a generally known manner between turbine 34 and drive-proximal housing wall 30 is a converter lockup clutch 44 having a torsional-vibration damper 46.

Connecting element 16 allows a drive shaft 48, which projects from a differential gear, to pass through perpendicularly to axis of rotation 27 between driving disk 8 and housing 28 of torque converter 6. By compensating for the requisite height differential, tubular connecting portion 15 of connecting element 16 makes it possible for converter 6 to be connected. Connecting element 16 may be designed as a shaped sheet metal part and manufactured in a forming process.

Figure 2:
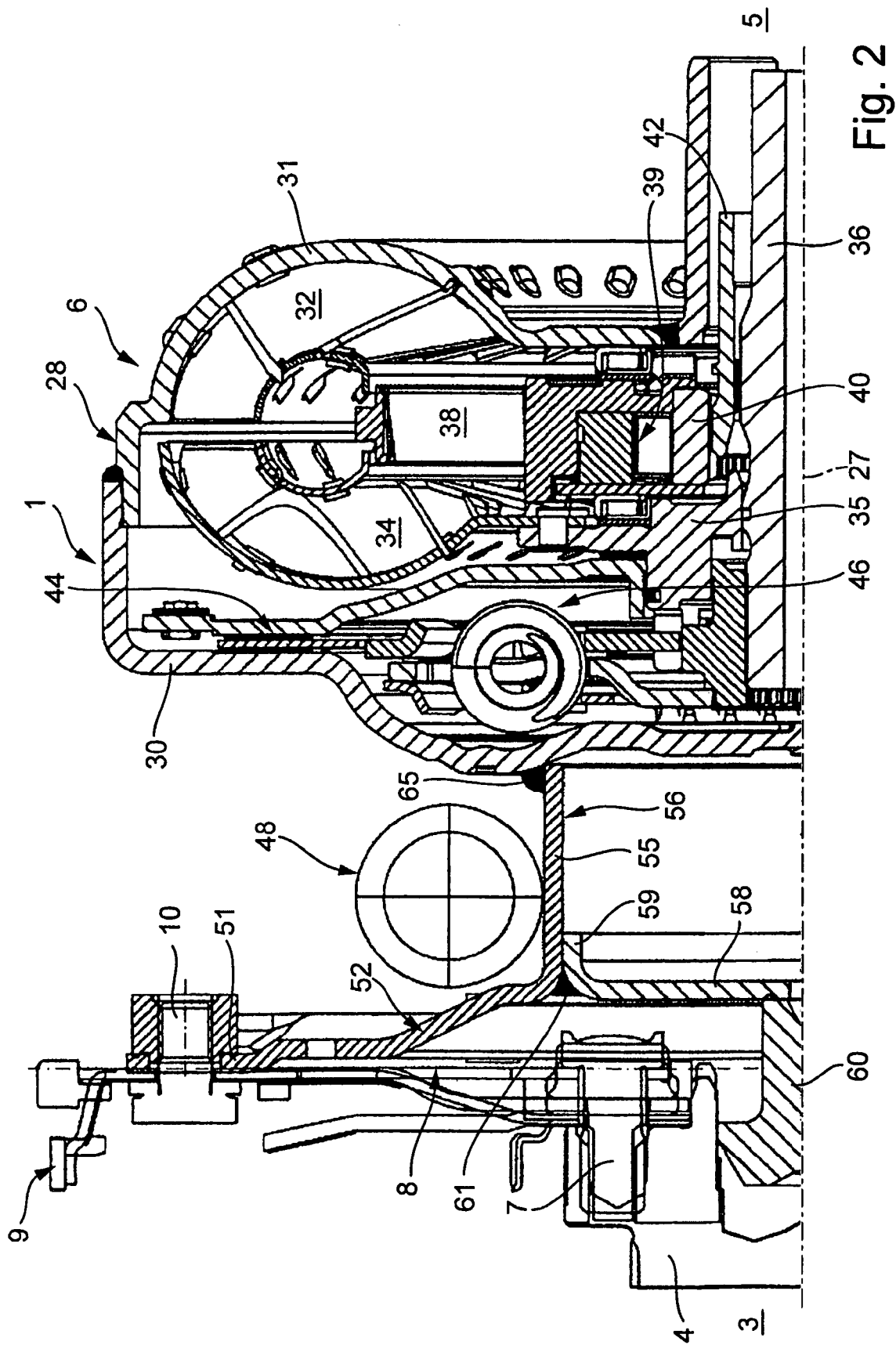
FIG. 2 shows a torque transmission device in accordance with a second exemplary embodiment, in half section.

Exemplary embodiments similar to those in FIG. 2 through 3 are shown in FIG. 1. The same reference numerals are used to identify equivalent parts. To avoid repetitive explanations, reference is made to the preceding description of FIG. 1. In the following, only the differences between the individual exemplary embodiments are discussed in detail.

In the exemplary embodiment shown in FIG. 2, a torque converter drive plate 52, which has a fastening flange 51, is integrally formed in one piece with a tubular connecting portion 55 of a connecting element 56. Drive-side end of tubular connecting portion 55 is terminated by a circular disk-shaped end wall 58 which has a bent-over peripheral region 59. Bent-over peripheral region 59 of end wall 58 is configured on the inside of tubular connecting portion 55. Fastened to end wall 58 is a mushroom-shaped centering element 60 which extends into a recess of crankshaft 4. End wall 58 is secured radially outwardly by a weld seam 61 to connecting element 56. The transmission-side end of tubular connecting portion 55 of connecting element 56 is butt-welded by a weld seam 65 to drive-proximal housing wall 30 of housing 28 of torque converter 6. The exemplary embodiment shown in FIG. 2 has the advantage that, viewed in the axial direction, end wall 58 is attachable at different locations radially inside of tubular connecting portion 55. Accordingly, this exemplary embodiment may be adapted to different installation situations, without entailing substantial outlay.

In the exemplary embodiment shown in FIG. 3, a torque converter drive plate 72, which has a fastening flange 71, is integrally formed in one piece both with a tubular connecting portion 75 of a connecting element 76, as well as with a drive-side, disk-shaped end wall 78. As a result, the benefit is derived that connecting element 76 may be manufactured together with tubular connection portion 75, end wall 78, and torque converter drive plate 72, as well as with fastening flange 71 using forming processes, in particular rollforming processes. Sheet metal may be used as feedstock for the forming processes, in particular rollforming processes. Fastened to end wall 78 is a mushroom-shaped centering element 80 which extends into a recess of crankshaft 4. The transmission-side end of tubular connecting portion 75 of connecting element 76 is butt-welded by a weld seam 85 to drive-proximal housing wall 30 of housing 28 of torque converter 6.

The term tubular can include perfectly tubular and substantially tubular.

LIST OF REFERENCE NUMERALS 1. drivetrain
3. drive unit
4. crankshaft
5. transmission
6. torque converter
7. bolted connection
8. driving disk
9. flywheel ring gear
10. bolted connection
11. fastening flange
12. torque converter drive plate
14. fastening portion
15. connecting portion
16. connecting element
18. end wall
20. centering element
21. weld seam
22. weld seam
24. fastening flange
25. weld seam
26. centering tab
27. axis of rotation
28. housing
30. housing wall
31. housing wall
32. impeller
34. turbine
35. turbine hub
36. input shaft
38. stator
39. freewheel
40. impeller hub
42. tubular piece
44. converter lockup clutch
46. torsional-vibration damper
48. drive shaft
51. fastening flange
52. torque converter drive plate
55. connecting portion
56. connecting element
58. end wall
59. peripheral region
60. centering element
61. weld seam
65. weld seam
71. fastening flange
72. torque converter drive plate
75. connecting portion 76. connecting element
78. end wall
80. centering element
85. weld seam

What is claimed is:

1. A torque transmission device comprising:
a torque converter accommodated in a drivetrain of a motor vehicle for transmitting torque between a drive unit and a transmission, the torque converter having a converter housing rotationally mounted about an axis of rotation and nonrotatably connected to the drive unit via a torsionally fixed connection between the drive unit and the converter housing, the torsionally fixed connection including a tubular connecting element disposed coaxially to the axis of rotation of the converter housing,
wherein the connecting element creates a recess radially outside of the connecting element in an axial direction between the drive unit and the converter housing, the spacing between the drive unit and the converter housing of the recess allowing a drive shaft to pass through the recess perpendicularly to the axis of rotation of the converter housing.

2. The torque transmission device as recited in claim 1 wherein the torque converter includes a fastening flange attached to the converter housing and extending from an end of the connecting element facing the converter housing.

3. The torque transmission device as recited in claim 2 wherein the fastening flange projects radially outwardly from the end of the connecting element facing the converter housing.

4. The torque transmission device as recited in claim 2 wherein the fastening flange includes a plurality of centering tabs engaging in centering recesses provided in the converter housing.

5. The torque transmission device as recited in claim 1 wherein an end of the connecting element facing away from the converter housing is terminated by an end wall.

6. The torque transmission device as recited in claim 5 wherein the end wall is integrally formed in one piece with the connecting element.

7. The torque transmission device as recited in claim 5 wherein the end wall has the shape of a circular disk having a bent-over peripheral region.

8. The torque transmission device as recited in claim 5 wherein the end wall has a centering element.

9. The torque transmission device as recited in claim 1 wherein the torque converter includes a torque converter drive plate fastened to an end of the connecting element facing away from the converter housing.

10. The torque transmission device as recited in claim 9 wherein the torque converter drive plate has a tubular fastening portion, a driving flange projecting radially outwardly from the tubular fastening portion.

11. The torque transmission device as recited in claim 9 wherein the torque converter drive plate and the connecting element are integrally joined together to form one piece.

12. The torque transmission device as recited in claim 1 wherein the connecting element is a formed part.

13. The torque transmission device as recited in claim 1 wherein the connecting element is a rollformed part.

* * * * *